H. WYMAN.
Shuttle-Box Motion for Looms.
No. 227,667. Patented May 18, 1880.
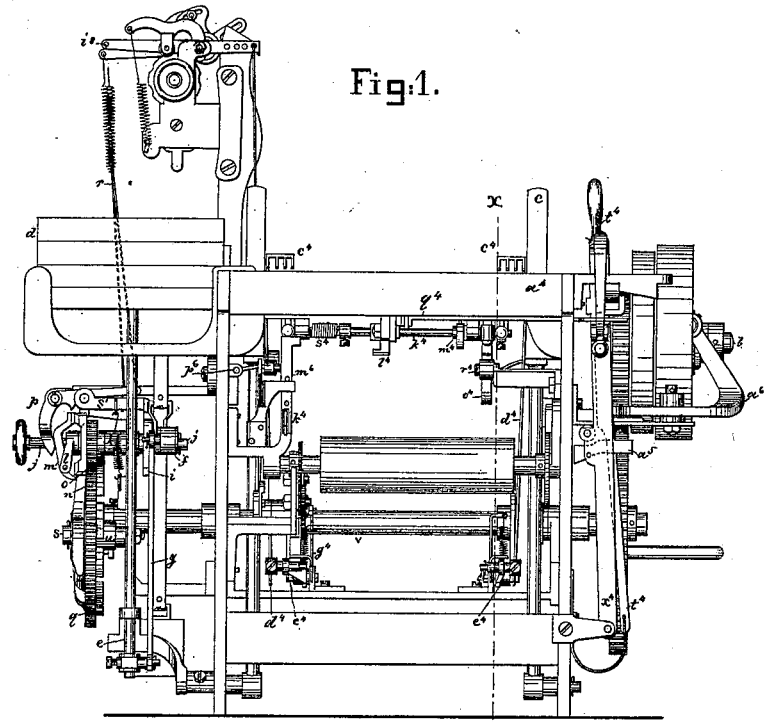
Fig. 1.
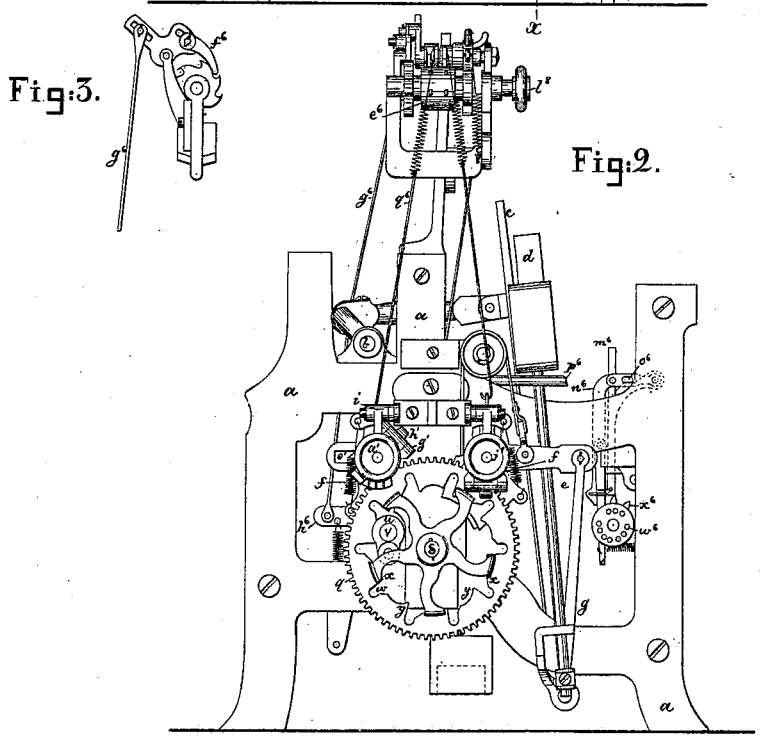
Fig. 3.
Fig. 2.
Witnesses.
E. C. Perkins.
W. J. Pratt.
Inventor.
Horace Wyman
by Crosby & Gregory
Attys 6 Sheets—Sheet 2.
H. WYMAN.
Shuttle-Box Motion for Looms.
No. 227,667. Patented May 18, 1880.
Fig. 5. Fig. 4. Fig. 6.
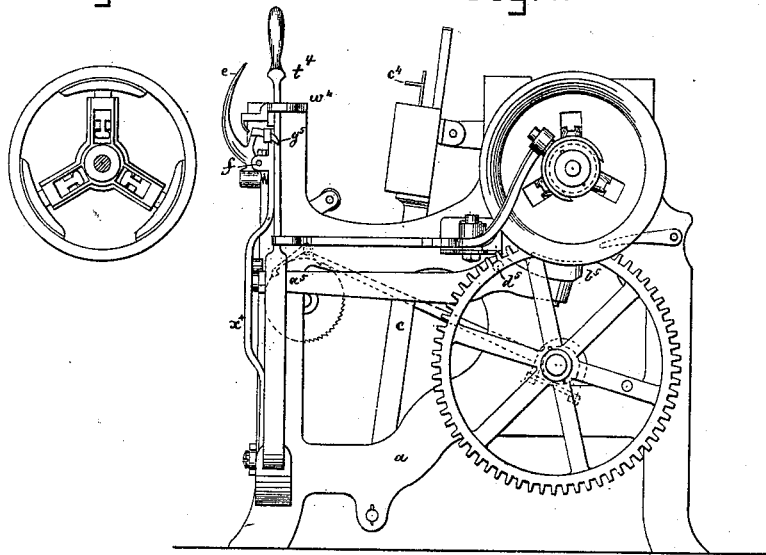
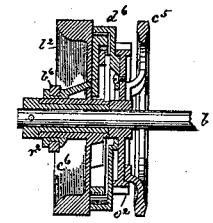
Fig. 7.
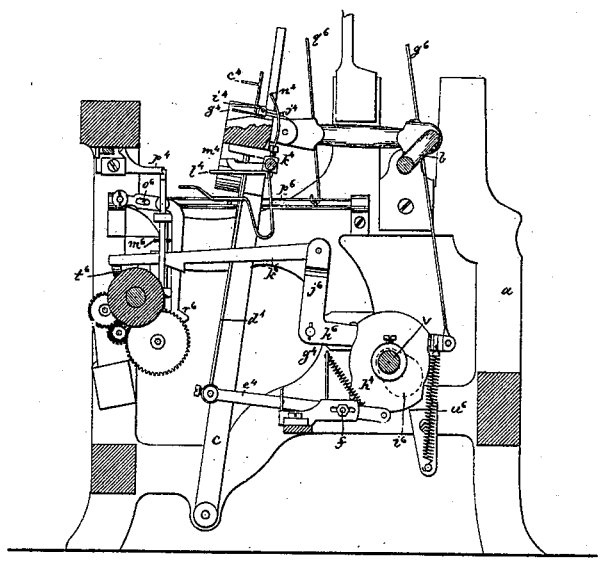
Witnesses.
E. C. Perkins.
W. J. Pratt.
Inventor.
Horace Wyman
by Crosby & Gregory
Attys 6 Sheets—Sheet 3
H. WYMAN.
Shuttle-Box Motion for Looms.
No. 227,667. Patented May 18, 1880.
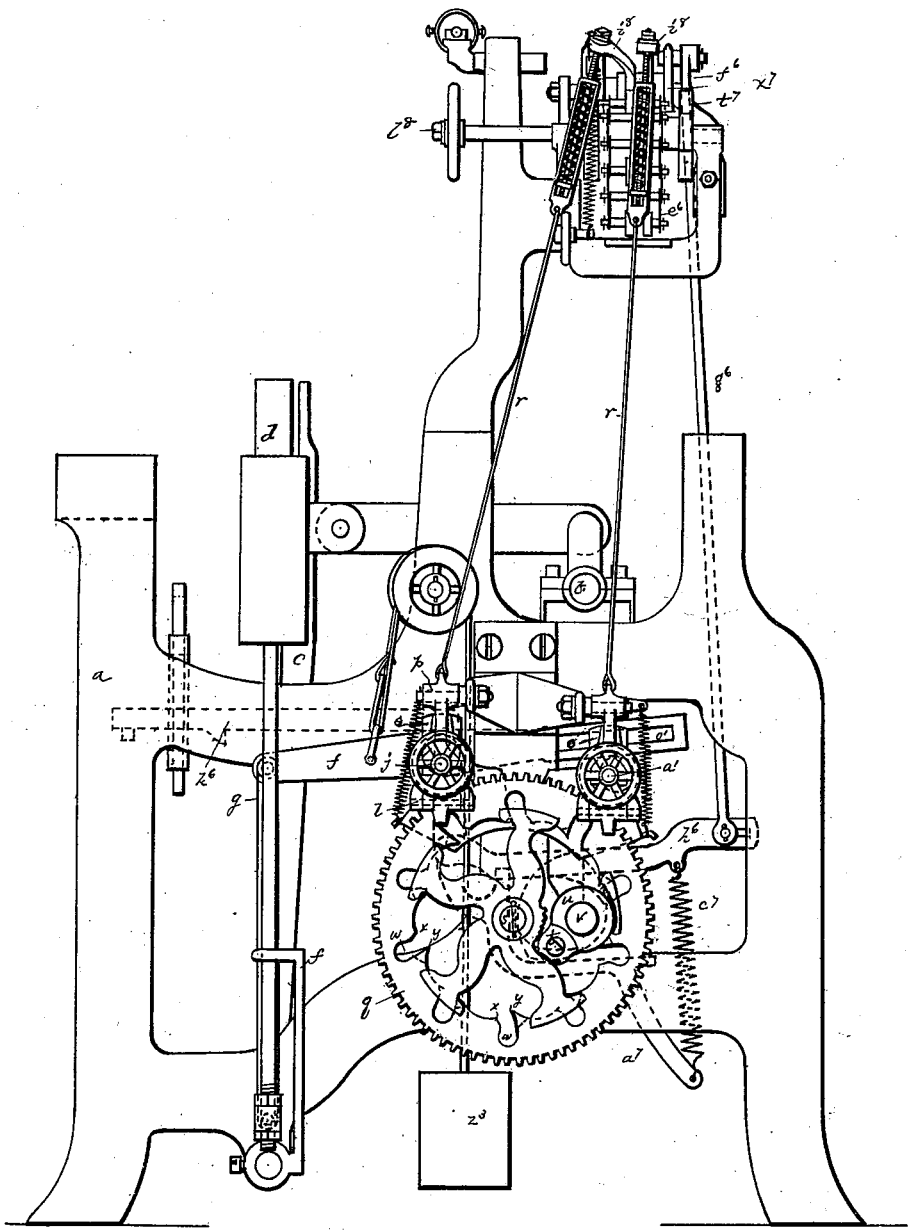
Witnesses—
W. J. Pratt.
E. C. Perkins.
Inventor—
Horace Wyman
per Crosby & Gregory Attys

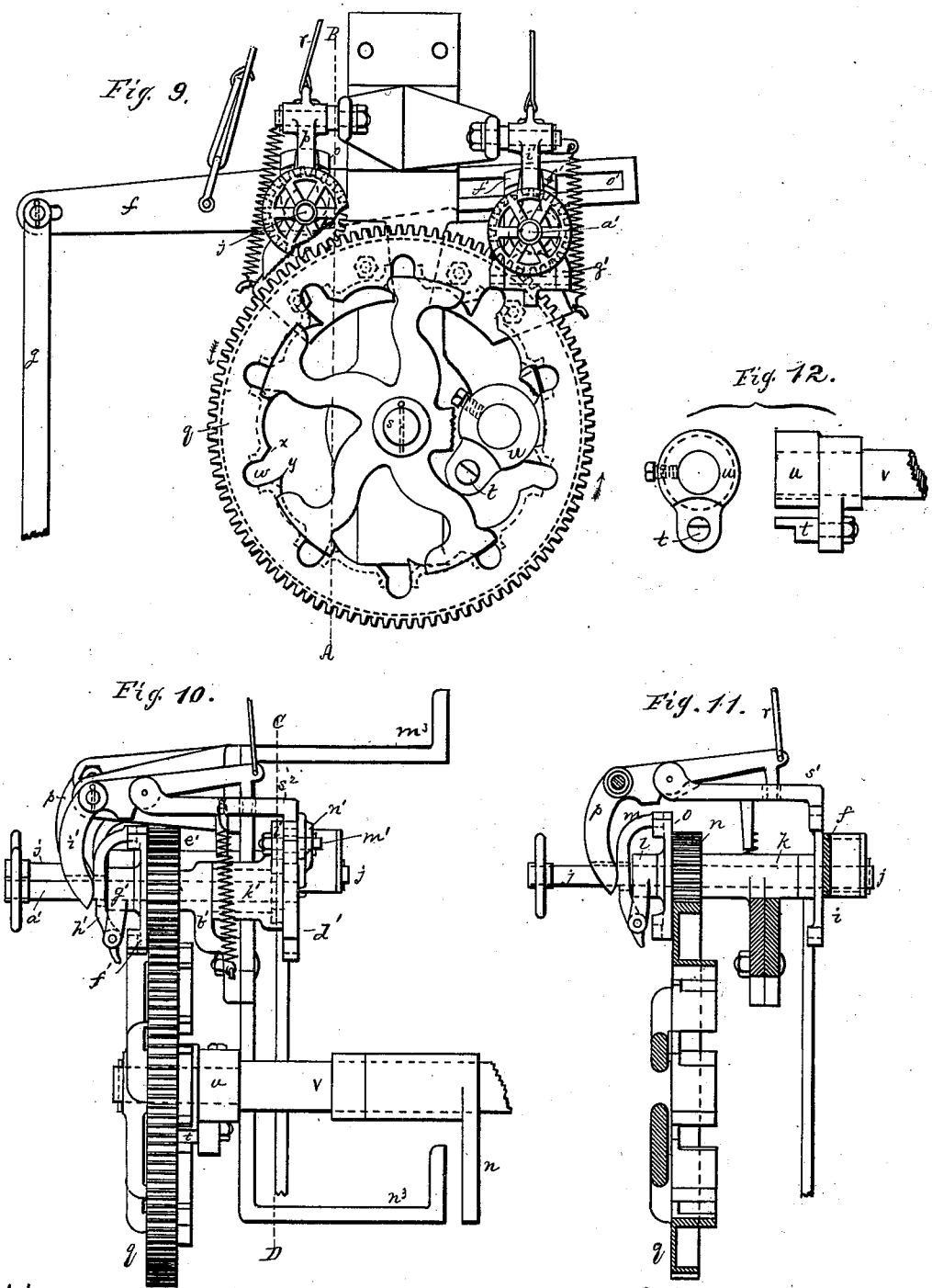
H. WYMAN.
Shuttle-Box Motion for Looms.
No. 227,667. Patented May 18, 1880.

6 Sheets—Sheet 5.
H. WYMAN.
Shuttle-Box Motion for Looms.
No. 227,667. Patented May 18, 1880.
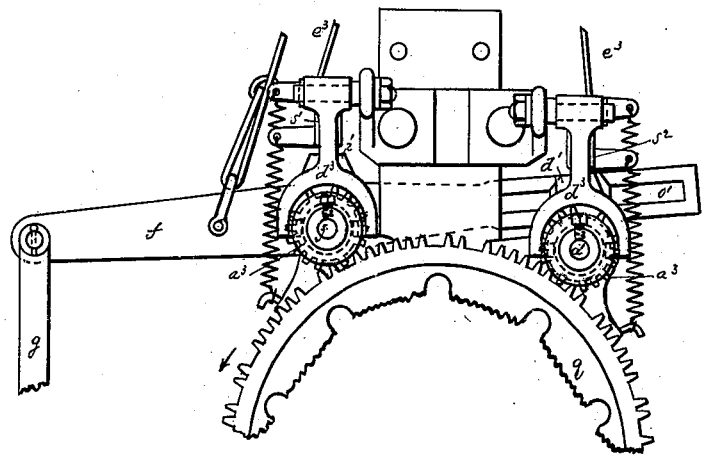
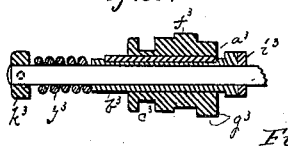
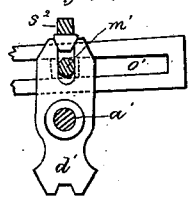
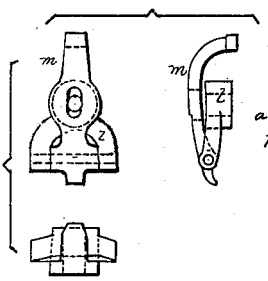
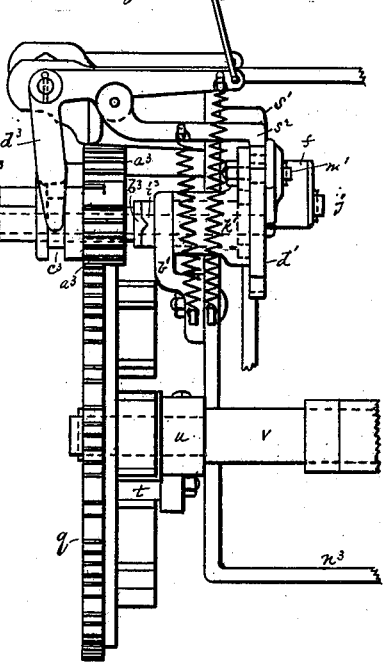
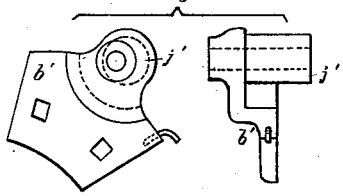
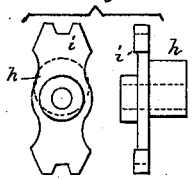
Witnesses—
W. J. Pratt.
E. C. Perkins.
Inventor—
Horace Wyman
per Crosby & Gregory Attys 6 Sheets—Sheet 6.
H. WYMAN.
Shuttle-Box Motion for Looms.
No. 227,667. Patented May 18, 1880.
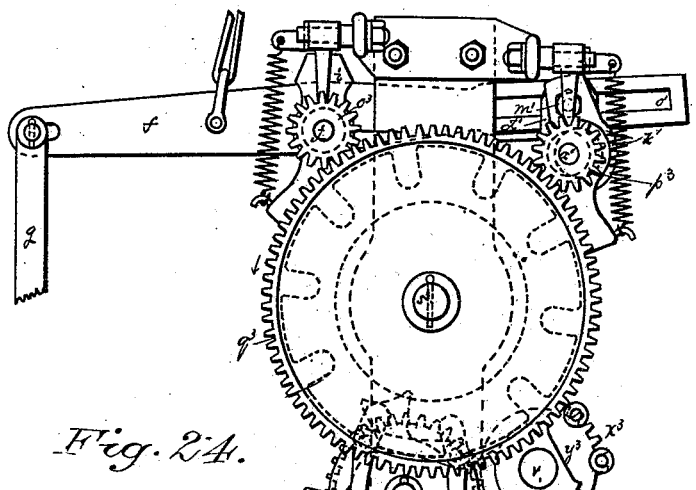
Fig. 22.
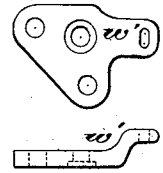
Fig. 25.
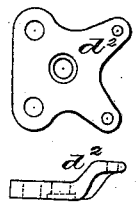
Fig. 24.
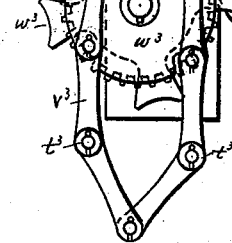
Fig. 23.
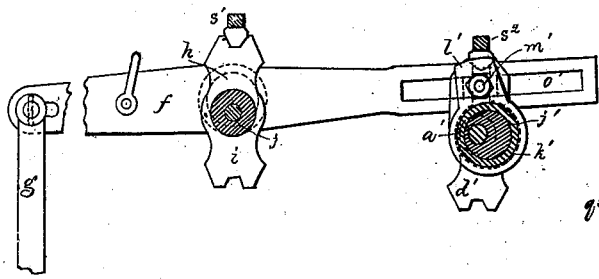
Fig. 13.
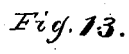
Fig. 26.
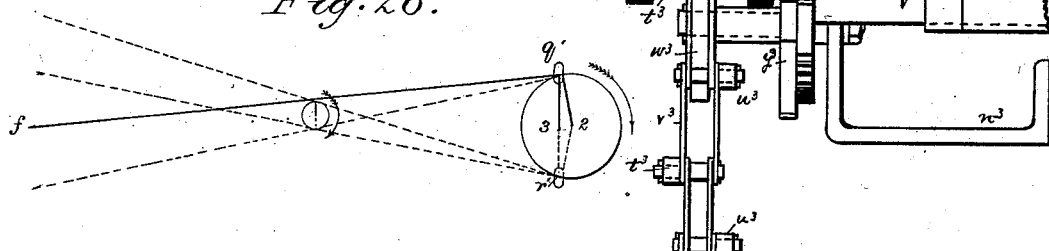
Witnesses—
W. J. Pratt.
E. C. Perkins.
Inventor—
Horace Wyman
per Crosby & Gregory
Attys

UNITED STATES PATENT OFFICE.

HORACE WYMAN, OF WORCESTER, MASSACHUSETTS.

SHUTTLE-BOX MOTION FOR LOOMS.

SPECIFICATION forming part of Letters Patent No. 227,667, dated May 18, 1880.

Application filed May 19, 1877.

*To all whom it may concern:*

Be it known that I, HORACE WYMAN, of the city and county of Worcester, in the State of Massachusetts, have invented an Improvement in Shuttle-Box Motions for Looms, of which the following is a specification.

This invention relates to improvements in looms, and has reference to mechanism for operating the shuttle-boxes. The shuttle-box rod is operated to raise or lower the shuttle-boxes by means of a single lever having its fulcrum on an eccentric, and adapted to be operated at its other end by a crank-pin that enters a slot or equivalent in the lever. In this way the forward end of the shuttle-box lever rises or falls in unison with the rising and falling of the boxes, the lever and the boxes moving simultaneously. The crank operating the lever at its end, instead of being directly upon the rotating shaft, as in my former patents, is upon a sleeve placed eccentrically to such shaft, the sleeve and the crank being operated by a slotted arm upon the shaft. By this construction a semi-rotation of the shaft and slotted arm causes the sleeve and its crank, at one movement, to revolve less than a semi-rotation, and at the next movement more than a semi-rotation. In this way the center of motion, about which the crank moves, and the crank itself, when stopped, always fall in a line at right angles to a line drawn longitudinally through the center of the shuttle-box lever and the crank-pin, and the lever is consequently stopped at its extreme highest and lowest positions, rather than a little below such points, as heretofore, and the retrocession of the end of the lever, as would be the case if the crank-pin stopped at a point directly above the center of the shaft, is obviated.

It is obvious that a simple crank revolving intermittingly in one direction only could not practically move a crank-pin so as to stop it at the highest and lowest positions of the box-lever, for to so operate the crank the shaft would have to be moved at one step less than a semi-rotation and at the next step more than a semi-rotation in the same interval of time, which could not be well done so long as the shaft was driven from a main shaft of a loom moving at a uniform velocity. This unequal distance of movement of the shuttle-box-actuating crank-pin in the same interval of time, to thereby not disarrange the timing of the parts, constitutes one of the main features of this my invention for moving the shuttle-boxes; and in order that it may be understood I have shown several different systems of mechanical devices whereby the invention may be successfully practiced.

In the different forms of my invention hereinafter described, it will be noticed that the crank-pin that moves the rear end of the box-lever, in moving such end of such lever from one to another position of rest, always moves the lever in but one direction, and the end of the lever, in coming to its position of rest, does not have imparted to it a short retrograde motion, thereby moving the shuttle-boxes a little, either up or down, from the lowest or highest position assumed during the movement of the lever from one to its next position of rest.

Figure 1 represents, in front view, a loom embodying my invention, the shuttle-box mechanism being placed at the left-hand end of the loom, viewing it from the front; Fig. 2, a view of that end of the loom carrying the shuttle-box-moving mechanism; Fig. 3, a detail of the pawl to move the pattern mechanism; Fig. 4, a view of that end of the loom carrying the driving and stopping mechanism; Figs. 5 and 6, details of such mechanism; Fig. 7, a section on line $x\ x$, Fig. 1, the lay-race being broken out to show the weft-feeling mechanism. Fig. 8 represents a modification, in end elevation, the shuttle-box mechanism being placed at the right-hand end of the loom; Fig. 9, an enlarged detail of the shuttle-box lever shown in Fig. 8, and its actuating devices; Fig. 10, a side view of Fig. 9, looking from the back of the loom; Fig. 11, a section on line A B, Fig. 9; Fig. 12, an end and side view of the pin-wheel to drive the star-gear; Fig. 13, a section on line C D, Fig. 10, looking toward the loom; Fig. 14, a sectional detail, showing the back end of the shuttle-box lever with the sleeve and eccentric shown in Fig. 13 removed but with the crank-pin of the sleeve left in the slot of the lever; Fig. 15, an end, a side elevation, and a plan of the clutch-finger, which, when in operation, is secured to a rotating shaft; Fig. 16, an end elevation and plan of the clutch-gear to be engaged by the clutch-finger; Fig. 17, an end and side elevation of the stand and its eccentric-bearing to support the sleeve;

Fig. 18, an end and side elevation of the arm and eccentric-hub, to serve as the fulcrum for the box-lever; Fig. 19, a partial end elevation of a modified plan for operating the shuttle-box lever; Fig. 20, a section through the pinion and sleeve upon the shaft; Fig. 21, a side elevation of Fig. 19; Fig. 22, an end elevation of yet another plan to move the shuttle-box lever; Fig. 23, a side elevation thereof. Figs. 24 and 25 are views of the vibrating plates, to which are secured the small gears to operate the segments on the shafts when the crank-pin oscillates intermittingly; Fig. 26, a detail of the movement of the lever when operated by devices shown in Figs. 1 to 18, the crank then rotating intermittingly.

The loom-frame $a$ may be of any suitable construction to sustain the working parts. The crank-shaft $b$, lathe $c$, shuttle-boxes $d$, shuttle-box rod $e$, and stirrup are or may be of any usual construction.

The shuttle-box lever $f$, connected by a link, $g$, with the shuttle-box rod, and so as to move at its forward end with the boxes, has its fulcrum on an eccentric-hub, $h$, (see Figs. 13 and 18,) projecting from a double arm, $i$, connected with a shaft, $j$, mounted in a bearing, $k$, and provided with an eared collar, $l$, to which is pivoted a clutch-finger, $m$. (See Figs. 11 and 15.) Placed loosely upon this shaft is a clutch-pinion, $n$, having an attached notched plate, $o$, with which the clutch-finger $m$ is made to engage at proper times by means of the lever $p$, connected, by wire $r$ or otherwise, with one of the fingers resting upon the pattern mechanism, as in a loom heretofore patented to me, No. 129,640, July 16, 1872, to which reference may be had.

The pinion $n$ meshes with the teeth at the periphery of the star-wheel $q$, mounted on a stud, $s$, and rotated intermittingly by a pin, $t$, on a hub, $u$, of a pin-wheel attached to the rotating lower shaft $v$ of the loom. The inner portion of the star-wheel is provided with a series of notches, $w$, forming internal teeth. The entrance into each notch is cut away, as at $x$, and left to project, as at $y$, whereby the pin $t$ may easily enter the notches and quickly start up the wheel, and, by operating upon the projecting portions $y$, stop the wheel slowly, thereby turning such wheel with less jar and greater accuracy than were the notches simply radial, and at greater speed than were the notches or teeth made upon the outer portion of the wheel, as in my former patent, to which reference has been made.

The normal condition of the clutch-finger $m$ is out of engagement with the notched part of the pinion, which is loose on its shaft, said pinion being adapted to be rotated half-way around at each rotation of the shaft $v$ or at each movement of the star-wheel $q$. When the clutch-finger is disengaged the pinion $n$ will turn and not move the shaft $j$; but if the clutch-finger engages the part $o$, through the action of the knee-lever $p$, moved by the pattern-surface, then the shaft $j$ will be rotated half around, and the eccentric $h$ (the fulcrum of the box-lever) will lift or lower the lever sufficiently to move the boxes one cell.

A second shaft, $a'$, Figs. 2, 10, 13, and 14, supported in a bracket, $b'$, shown attached to the loom-frame by bolts passing through holes $c'$, (see Fig. 17,) has at its innermost end double arms $d'$. Upon this shaft is a loose pinion, $e'$, having an attached notched plate, $f'$, thereby making it a clutch-gear, as before described, and attached to the shaft is a collar, $g'$, having an attached clutch-finger, $h'$, pressed into engagement with the clutch part $f'$ at suitable times, according to the indications of the pattern, through a lever, $i'$, connected, as usual, with a finger resting upon the pattern cylinder or chain.

The clutch-gear and clutch-finger and their operative mechanism are the same for each intermittingly-rotating shaft $j$ and $a'$.

The bracket $b'$ has at one side an eccentric hub or bearing, $j'$, that receives the sleeve $k'$, having an ear, $l'$, to which is connected a crank-pin, $m'$, (see Figs. 10 and 13,) which, after passing through the slot at one end of the arm $d'$, is provided with a swiveling block, $n'$, or equivalent, adapted to enter the slot $o'$ at the rear end of the shuttle-box lever $f$.

The crank-pin of a semi-rotating shaft, when moving from its low to its high point, or vice versa, at that side of the shaft next the fulcrum of the lever to be moved by the crank-pin, will cause the outer end of the said lever to recede or move back from its extreme high or low point for a short distance as the crank-pin comes to its extreme positions of rest. This box-lever should be held at rest by the pin just as the rear end of the lever reaches both its highest or lowest positions during the rotation of the crank-pin. The extreme throw of such a crank-pin in its rotation is exerted upon the shuttle-box lever just before and just after the crank-pin rotating in the direction of the arrows in Fig. 26 reaches its position in a vertical line drawn through the center of the shaft. To stop the crank-pin at these two high and low points (marked in Fig. 26 $q'$ $r'$) it is necessary that the pin move a greater distance when moving from the high to the low point in the direction of the arrow, Fig. 26, than in moving from the low to the high point. Each of these movements must, however, be made in exactly the same period of time. To accomplish this I have placed the crank-pin upon the arm of the sleeve $k'$, and have mounted the sleeve upon a stationary eccentric, through which the shaft $a'$ extends and in which it is rotated.

As the shaft rotates, a slot in the double arm $d'$ engages the pin $m'$, projecting from the arm of the sleeve, and revolves such sleeve and crank-pin about the eccentric at unequal speeds and through varying distances at each alternate motion, notwithstanding the arm moves at the same speed and through the same distance at each operation. This enables me to stop the crank-pin just before it reaches a position above the shaft $a'$ in a vertical line with its center, and just after, in its rotation below the shaft, it passes a point in a line drawn vertically through the center of the shaft.

By this construction of the devices for operating the end of the box-lever, the crank-pin being separated from the shaft and controlled as to its position through an eccentric, it is possible at one semi revolution or movement of the shaft $a'$ to move the crank-pin through an arc less than one hundred and eighty degrees, and at the next semi-rotation to move it more than one hundred and eighty degrees.

In Fig. 26 the point 3 shows the center of motion of the shaft $a'$, and the point 2 the center of motion of the crank-pin, it being placed eccentrically with relation to the center 3.

The center of motion of the crank-pin, when the box-lever is stopped, should fall in a line substantially at right angles to a line drawn through the center of motion of the shuttle-box lever and the center of the crank-pin. Consequently the crank-pin is at its greatest throw when located as shown at $q'\, r'$, Fig. 26, and a line drawn from such points to the point 2 will fall back of a line drawn from such points to the center 3. The crank in its movement, whether through the longest or shortest arc, will move in the same period of time through the action of the eccentric upon the sleeve. The crank-pin, in its rotation, will be moved by the eccentric to and from the center of the shaft that rotates the double arm slotted to receive the crank-pin.

The throw of the crank-pin $m'$ is sufficient to operate the shuttle-box lever far enough to move the shuttle-boxes from any cell to the second one from it, skipping one box, and as the eccentric $h$ moves the box-lever to change the boxes from one to the next cell, as before described, it results that by the separate or augmented or discounted movement of the crank and eccentrics the lever may be operated to shift from any one to any other shuttle-box of the series of four boxes, that being the number contemplated and provided for in this present embodiment of my invention.

The double arms $i\, d'$ are each provided at each end with a notch, into which falls a holding-latch, $s'$ or $s^2$, pivoted to the knee-levers $p$ and $i'$, that operate the clutch-fingers. These latches are each held down by a spring, and they retain the arms in position when not moved positively by the shafts, and serve to stop the arms at the end of each movement.

In my former patent these knee-levers $p$ and $i'$ and latches were in one piece. By separating them I am enabled to hold the arms in position during the time that the knee-levers act to engage and disengage the clutches, during which time, under my former construction, the arms and shafts were liable to be moved prematurely, which prevented the catch from properly engaging and operating the shaft and box-lever.

In a modification of my invention (shown in Figs. 19, 20, 21) the box-lever has its fulcrum on an eccentric connected with the shaft $j$, or the arm $i$ thereof, and so also the shaft $a'$ has attached to it an arm, $d'$, and the crank-pin $m'$ is carried by a sleeve, $k'$, mounted on an eccentric, as in the first plan. In this modification, however, the clutch-fingers and clutch-gear are dispensed with, and in their stead are employed long pinions $a^3$, twice as broad as the teeth of the star-gear. Each of such long pinions at one end has half of its teeth, extending over one hundred and eighty degrees of its periphery, cut away to a line, $x\, x$, drawn through the pinion, (see Fig. 20, which shows in section one of these broad pinions and the loose clutch-sleeve on which it is keyed, so as to rotate with it and to move longitudinally thereon,) and at the other end of the pinion the teeth are also cut away for one hundred and eighty degrees, but at the side opposite that from which the other teeth were removed. These broad pinions have each an annular groove, $c^3$, to receive the forked end of a pivoted arm or lever, $d^3$, connected by wire or cord $e^3$ with a finger resting upon or controlled by the pattern-cylinder, so as to move the arms $a^3$ at suitable times and reciprocate the pinions horizontally upon their sleeves $b^3$, so as to bring one of the set of teeth, $f^3$ or $g^3$, into position to be engaged by the teeth of the star-wheel, which is like the other star-wheel, before described, except that its teeth are cut away at certain intervals, so as to leave blocks of teeth—in this instance, blocks consisting of two teeth, a space equal to one tooth, then six teeth, then a space equal to one tooth, then two teeth, and then a space equal to one tooth, and so on.

The end of each sleeve $b^3$, mounted loosely upon the shaft, is made V-shaped to enter a V-shaped notch in a collar, $i^3$, fast upon the shaft, surrounded by the sleeve and pinion. Each sleeve is crowded in one direction by a spring, $j^3$, the force of which is regulated by an adjustable collar, $k^3$, so as to engage the notched collar $i^3$ with more or less force, but so as to slip in case of any obstruction to the movement of the boxes.

Referring to Fig. 21, wherein both pinions $a^3$ are shown, the teeth at the left end of the pinions are in position to be engaged by the teeth of the star-wheel, it being moved far enough at each movement to impart to each shaft, $j$ or $a'$, a semi-rotation, at which time the spaces or portions of the pinions unprovided with teeth come opposite the teeth of the star-wheel. Now, further movement of the star-wheel will not rotate such pinions; but if it is desired to rotate them, and consequently the eccentric-fulcrum and crank-pin, or either of them, to move the box-lever, a space on the pattern-cylinder will permit the spring connected with the finger $d^3$ to move the pinion (one or both) according to the box to be selected, and the pinion shifted to the left will bring its right-hand end in position above, and so that the half-circle of teeth $g^3$ will be engaged by the teeth of the star-gear, which will turn the shaft $j$ or $a'$ half a rotation, when it will stop until the pinion is again shifted laterally. In this modification the crank-pin in the slot operates in the same order of time, and through arcs of circles, as does the rotating crank-pin in the first plan. The teeth on the star-wheel being removed permits the pinion to be shifted without interference between the cogs.

Suitable stands, $m^3\ n^3$, in all the figures hold the devices for operating the box-lever.

In the modification shown in Figs. 22 and 23 (an end and side elevation) each pinion $o^3 p^3$ is attached directly to the shafts $j\ a'$, each of which is provided with connected devices, like those shown in and adapted to operate the box-lever in the manner described in the first plan. These pinions $o^3\ p^3$ are each engaged by its own star-wheel $q^3\ r^3$, each mounted loosely upon a common stud, $s^3$, and engaged by pins $t^3\ u^3$ on a pattern-chain, $v^3$, carried by a wheel, $w^3$, moved intermittingly by teeth $x^3$ on a form of "Geneva-stop" wheel $y^3$, moved continuously from the rotating shaft $v$.

The pins upon the chain will be arranged to rotate the star-wheels $q^3\ r^3$ at proper intervals, according to the pattern to be woven, each movement of each of such wheels being sufficient to impart a semi-rotation to each shaft $j$ or $a'$.

The weight $z^3$, connected by a strap with the box-lever, acts as a counter-balance for such lever and the boxes.

I claim—

1. A shuttle-box lever of the first order, and a shuttle-box rod and shuttle-boxes, combined with a revolving crank-pin and means to intermittingly operate the same through longer and shorter arcs, as set forth, whereby the back end of the shuttle-box lever is moved continuously in but one direction when changing from one to its next position of rest, to thereby obviate retrograde movement of the shuttle-box lever and boxes when coming to a position of rest, substantially as described.

2. A pivoted shuttle-box lever of the first order, a series of connected shuttle-boxes, a crank-pin in direct contact with the said lever, and means to move it intermittingly forward in one direction through arcs of different lengths, as described, whereby retrograde motion of the shuttle-box lever and box is obviated, substantially as described.

3. A shaft and means to rotate it intermittingly, an arm connected with a stationary eccentric arranged with its longest axis outside of a vertical line passing through the axis of the said shaft, combined with the sleeve and its crank-pin $m'$, whereby the crank-pin may be moved alternately more and then less than a semi-rotation, while the shaft, at each movement to actuate the crank-pin, makes a semi-rotation, substantially as set forth.

4. A shuttle-box lever of the first order and a series of connected shuttle-boxes, substantially as set forth, a crank-pin in direct contact with the said lever at one end to move the shuttle-boxes two cells, an arm to support the crank-pin, a shaft, $a$, and means to impart to it intermittingly a semi-rotation, while the crank-pin moves during the same time less than one hundred and eighty degrees, combined with the eccentric-fulcrum, about which the shuttle-box lever turns but does not slide, and means to turn the said eccentric intermittingly and move the shuttle-box lever and boxes the distance of one cell, substantially as described.

5. A shuttle-box lever of the first order, with a tier of shuttle-boxes, and means to connect the same, a shaft located near the rear end of the said shuttle-box lever, and mechanism to rotate it intermittingly through an arc of one hundred and eighty degrees, an arm, $d'$, carried by the said shaft, and a crank-pin disconnected from but actuated by the said arm, the said crank-pin being in contact with and adapted to operate the said shuttle-box lever, substantially as described.

In testimony whereof I have signed my name to this specification in the presence of two subscribing witnesses.

HORACE WYMAN.

Witnesses:
J. B. SYME,
J. A. WARE.